United States Patent [19]
Delabastita et al.

[11] Patent Number: 5,818,604
[45] Date of Patent: Oct. 6, 1998

[54] HIGH PRECISION GRADATION COMPENSATION FOR STOCHASTIC SCREENING

[75] Inventors: Paul A. Delabastita, Antwerp; Frank A. Deschuytere, Beveren, both of Belgium

[73] Assignee: Agfa-Gevaert, Mortsel, Belgium

[21] Appl. No.: 642,115

[22] Filed: May 2, 1996

Related U.S. Application Data

[63] Continuation of Ser. No. 106,333, Aug. 13, 1993, abandoned.

[51] Int. Cl.$^6$ .............................. H04N 1/40; H04N 1/52
[52] U.S. Cl. ......................... 358/298; 358/456; 358/536
[58] Field of Search ................................. 358/298, 296, 358/300, 302, 429, 454, 456–459, 463, 465, 466, 521, 530, 533–536; 395/101, 109, 128; 347/131, 133; 382/237, 238, 251, 252, 275, 299, 302

[56] References Cited

U.S. PATENT DOCUMENTS

| | | | |
|---|---|---|---|
| 4,347,523 | 8/1982 | Ohara | 346/108 |
| 4,920,501 | 4/1990 | Sullivan et al. | 358/458 X |
| 5,111,310 | 5/1992 | Parker et al. | 358/456 |
| 5,166,809 | 11/1992 | Surbrook | 358/456 |
| 5,278,670 | 1/1994 | Eschbach | 358/448 X |
| 5,335,089 | 8/1994 | Xie et al. | 358/456 |
| 5,341,228 | 8/1994 | Parker et al. | 358/534 |
| 5,363,213 | 11/1994 | Coward et al. | 358/456 X |
| 5,394,252 | 2/1995 | Holladay et al. | 358/534 X |
| 5,426,519 | 6/1995 | Barton | 358/534 X |

FOREIGN PATENT DOCUMENTS

| | | | |
|---|---|---|---|
| 0095716 | 12/1983 | European Pat. Off. | H04N 1/40 |
| 0207246 | 7/1987 | European Pat. Off. | H04N 1/23 |
| 0291300 | 11/1988 | European Pat. Off. | H04N 1/40 |
| 0334518 | 9/1989 | European Pat. Off. | H04N 1/40 |
| WO9213421 | 6/1992 | European Pat. Off. | H04N 1/40 |

*Primary Examiner*—Eric Frahm
*Attorney, Agent, or Firm*—Richard J. Birch

[57] ABSTRACT

A halftone screen and method for generating halftones representing a continuous tone image, wherein the number of halftone dots per unit area varies non-proportionally with the tone values utilized as inputs to the screening process. The method incorporates an implicit gradation compensation as part of the frequency modulation halftoning itself to correct for the additional tone gain due to recording, plate processing and/or printing, as well as aesthetic corrections. This implicit compensation has the advantage that no external compensation is required, thereby maintaining the number of tone values which can be rendered on a digital system. Finally, the implicit gradation compensation enables the combination of page elements rendered according to either "conventional" or "frequency-modulated" halftoning techniques with appropriate tone-matching.

16 Claims, 12 Drawing Sheets

FIG.10

HIGH PRECISION GRADATION COMPENSATION FOR STOCHASTIC SCREENING

This is a continuation of application Ser. No. 08/106,333 filed on Aug. 13, 1993, now abandoned.

BACKGROUND OF THE INVENTION

Many reproduction methods are only capable of reproducing a small number of stable image tones. For example, offset printing or electrophotographic printing methods are only capable of printing two stable tone values i.e. deposit ink or toner or not. In order to reproduce images having continuous tones, a halftoning or screening technique is used. In the graphic arts environment, halftoning techniques convert density values of tints and images into a geometric distribution of binary dots that can be printed. The eye is not able to see the individual halftone dots, and only sees the corresponding "spatially integrated" density value. In a more general context, halftoning techniques can be seen as methods to convert "low spatial, high tonal resolution information" into an equivalent of "high spatial, low tonal resolution information". (The qualifiers "low" and "high" have to be seen on a relative scale in this context).

Two main classes of halftoning techniques have been described for use in the graphic arts field. These two techniques are known as "amplitude modulation" and "frequency modulation" halftone screening. In amplitude modulation screening the halftone dots, that together give the impression of a particular tone, are arranged on a fixed geometric grid. By varying the size of the halftone dots the different tones of images can be simulated. Consequently this technique can also be called "dot-size modulation screening". In frequency modulation screening the distance between the halftone dots is modulated rather then their size. This technique, although well known in the field of low resolution plain-paper printers, has not obtained much attention for offset printing and other high-end printing methods probably because of the disadvantages to be discussed further on.

Figure 1A:
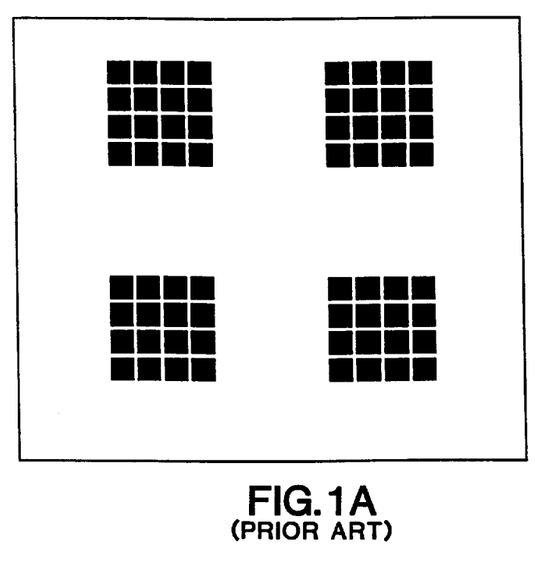
FIG. 1A and FIG. 1B show the total dot gain characteristic of dispersed halftone dot patterns in comparison with that of a clustered halftone dot distribution.
Figure 1B:
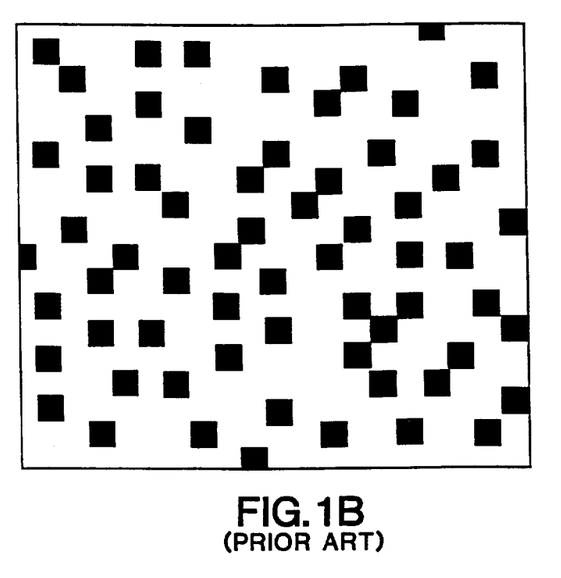

Both classes of halftone techniques are used in combination with a digital film recorder. A typical digital film recorder consists of a scanning laser beam exposing a photosensitive material at high resolution. The "grid" that defines the resolution at which the laser beam can be switched on or off usually has an element size in the range of 1/1800 of an inch. The photosensitive material can be a photographic film, from which a printing plate is later prepared by means of photomechanical techniques. The smallest addressable unit on a recorder is often called a "micro dot", "recorder element", or "rel". As illustrated in FIG. 1A and FIG. 1B, a dot-size modulated halftone dot is made up of a clustered set of recorder elements, while frequency modulated halftone dots constitute a dispersed set of individual recording elements.

The most important characteristics of a screening or halftoning technique for faithfully reproducing continuous tone information include:

1) The image rendering characteristics, more specifically the capability of the technique to render spatial detail in the original image content without the introduction of artifacts such as moiré, textures and noise, as well as the ability to render a full range of tones;
2) The photomechanical characteristics of the halftone dots produced by the method, which determine how consistently halftone dots can be recorded, copied or duplicated in the different steps of the photomechanical preparation of the printing plates; and,
3) The behavior of the halftones on an offset printing press.

The two classes of halftoning techniques, each with some of their variants, will now be reviewed in the light of the above characteristics, and their advantages and disadvantages will be discussed.

Amplitude Modulation Screening

Amplitude modulation screening has as its major advantages that it has excellent photomechanical reproduction characteristics, and that, for screens with rulings up to 200 dots/inch, it prints predictably on offset presses. An important disadvantage of amplitude modulation screening, however, is the fact that unwanted patterns can occur within the halftoned image. Depending on their origin, these patterns are called subject moiré, color moiré and internal moiré. Subject moiré results from the geometric interaction between periodic components in the original subject matter and the halftone screen itself. Methods addressing subject moiré are disclosed in e.g. U.S. Pat. No. 5,130,821, EP 369,302 and EP 488,324. These methods do not, however, completely solve the problem.

Color moiré results from interferences between the halftones of the different color separations of the image. The use of screen angles for the different color separations shifted by 60 degrees with respect to each other has been suggested to address this problem. Several disclosures relate to the problem of generating screens with these angles or close approximations thereof. See for example U.S. Pat. No. 4,419,690, U.S. 4,350,996, U.S. 4,924,301 and U.S. 5,155,599. Other combinations of angles, frequencies or relative phases of the halftone dot patterns for the different color separations have also been employed to overcome the problem of color moiré as described in U.S. Pat. No. 4,443,060, U.S. 4,537,470 and EP 501,126.

Internal moiré refers to patterns resulting from the geometric interaction between the halftones and the addressable grid on which they are rendered. Methods to reduce internal moiré are usually based on the introduction of a random element that breaks up or "diffuses" the phase error that periodically builds up as a consequence of the frequency and angle relation between the halftone screen and the addressable grid on which it is rendered. Examples of such techniques are disclosed in U.S. Pat. No. 4,456,924, U.S. 4,499,489, U.S. 4,700,235, U.S. 4,918,622, U.S. 5,150,428 and WO 90/04898.

Frequency Modulation Screening

None of the variants of the dot-size modulation screening have proven to be successful in completely eliminating the moiré problems and dot frequency modulation screening techniques have therefore been suggested to further reduce the problem. Various dot frequency modulation screening techniques have been disclosed and they can be divided into the following subclasses: (1) Point-to-point thresholding based techniques; (2) Error Diffusion techniques (and their variations); and, (3) Special techniques, such as that disclosed in DE 29,31,092, and further developed in U.S. Pat. No. 4,485,397.

The most representative example of point-to-point thresholding is the halftoning based on the "Bayer" dither matrix Bayer, B. E., "An Optimum Method for Two-Level Rendition of Continuous-Tone Pictures", Proc. IEEE International Conference on Communications, Conference Record, pp.

(26-11), (26-15), 1973. This Bayer dither matrix has a size that is a power of two, and contains threshold values that are arranged in such a fashion that, when thresholded against increasing levels of density, every halftone dot is "as far away as possible" from the halftone dots that are used to render the lower density levels.

Another point-to-point thresholding technique uses a "Blue Noise Mask" instead of a Bayer dither matrix. It is described in U.S. Pat. No. 5,111,310. The Blue Noise Mask is the result of an optimization (filtering) of a non-deterministic randomized mask performed iteratively (for the subsequent threshold "layers") between the halftone dot patterns produced by the mask and their Fourier transform.

The halftone dot patterns produced by the Bayer dither matrix contain strong periodic components, visible as "texture" that can potentially create moiré problems similar to the dot-size modulation algorithms. Because the energy of the periodic dither components is "spread" over the different harmonics, and because most of these harmonics have a relatively high frequency compared to the fundamental frequency of dot-size modulation, the moiré which occurs is less disturbing.

The "Blue Noise Mask" threshold matrix produces distributions of halftone dots which are aperiodic. This method is therefore free of the moiré problems which occur with the dot-size modulation methods or with the Bayer dither matrix. The aperiodic character of the halftone dot distributions of the Blue Noise Mask technique translates in the frequency domain into a "continuous" power spectrum. This suggests that at least some energy is also present in the very low frequency bands of the spectrum. This energy at low (visible) spatial frequencies is one of the reasons why tints rendered with the Blue Noise Mask technique may appear grainy. The relation between "graininess" introduced by frequency modulation halftoning techniques and the shape of the frequency spectrum is extensively discussed by Ulichney, Robert, "Digital Halftoning", MIT Press Cambridge, Mass., 1987, ISBN 0-262-21009-6.

Perhaps the best known of all "frequency modulation" techniques is the error diffusion algorithm. It comes in many variations, but the principle is always the same: the error that occurs as a result of the binarization (or, in a more general context, the quantization) of the image data during the rendering is "diffused" to one or more of the unprocessed pixels. Best known is the Floyd and Steinberg algorithm (Floyd, R. W., and L. Steinberg, "An Adaptive Algorithm for Spatial Greyscale", Proc. SID, vol. 17/2, pp. 75–77).

All of the frequency modulation halftoning techniques that produce aperiodic halftone dot distributions share the advantage that they are much less sensitive to the problems of moiré than the "dot-size modulation" techniques. Unfortunately, they also share the disadvantages of poor photomechanical behavior and a high tone gain on the press.

Dot Gain

The problem of tone gain arises from the fact that halftone dots can change their size in the various steps of the reproduction process. The first place where this takes place is during the recording of the halftone dots on film. This is related to the fact that the physical reconstruction function of the recorder/film system does not behave ideally. An "ideal recorder" would be capable of imaging "square" recorder elements with a size equal to one recording period on its addressable grid. Although a rigorous analysis is more complicated than it first appears, it is quite easy to accept the fact that in most practical systems, the optics of the recorder are not able to focus the scanning laser beam well enough to achieve this ideal. Instead, a recorder element is imaged as a more or less rounded square spot with an area that exceeds the area of an ideal recorder element. This results in a gain in size of the black halftone dots on the film. On films to be used with positive working printing plates, this results in a tone reproduction that makes the image generally darker. On films to be used with negative working printing plates, on the other hand, it makes the printed image lighter.

A second step in which changes in dot size can occur is the plate-making process. As in the previous discussion, a distinction must be made between "positive" and "negative" plate-making processes. In the positive plate-making process, internal light diffusion causes a smaller area on the plate to remain hydrophobic than the area of the corresponding black dot on the film. The resulting image is accordingly lighter than that corresponding to the film. In the negative plate-making process on the other hand, light diffusion causes a slightly larger area on the plate to become hydrophobic than the white (negative) dot on the film. Hence the dot that is printed is enlarged as a consequence of this effect, darkening the image.

It turns out that the way positive and negative halftone dots change size on the plate is just the opposite of the way they change size on the recorder. Both effects cancel each other to some extent, but it is usually the change in the plate-making process which dominates the net final effect. In this case it is also clear that dispersed halftone dot distributions change size more than clustered halftone patterns, thereby increasing the net final effect.

Figure 2:
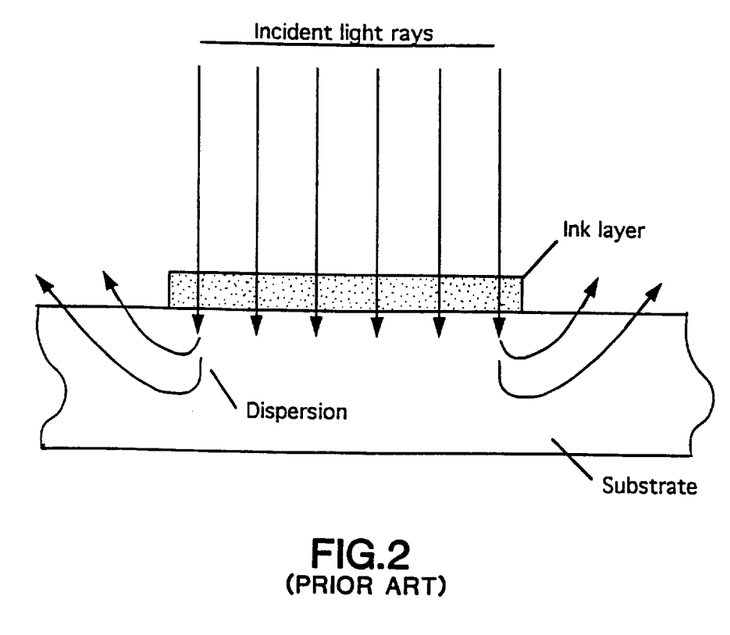
FIG. 2 illustrates the "optical dot gain" effect in the printing process.

A third place where dots change size is on the printing press itself. Two effects take place in this case. First there is the "physical dot gain" which is related to the fact that the ink of the halftone dots spreads out physically during the transfer from the (offset press) blanket to the paper on which printing is taking place. A second effect is called "optical dot gain", and is related to the optical dispersion which takes place in the paper at the boundaries of the halftone dots. FIG. 2 shows that a certain fraction of the light that has been spectrally filtered by the halftone dot near its boundary is diffused to the outside of the halftone dot, making the halftone dot effectively appear larger. Physical and optical dot gain each cause an apparent increase in the size of dots, and therefore cause tones to be rendered darker.

Since the gain in dot size, whether it occurs during recording, plate making, or printing is highly related to effects which take place at the boundaries of the halftone dots, it is to be expected that the amount of gain will be higher with halftone algorithms producing dispersed dither patterns as opposed to those producing clustered halftone dots. This is illustrated by means of FIG. 1A and FIG. 1B, which compares clustered dots and a distribution of dispersed dots having the same total area. The total perimeter of the dispersed dots in FIG. 1A however is four times larger than that of the clustered dots in FIG. 1B, and the total amount of gain is therefore also expected to be four times as large.

Figure 3:
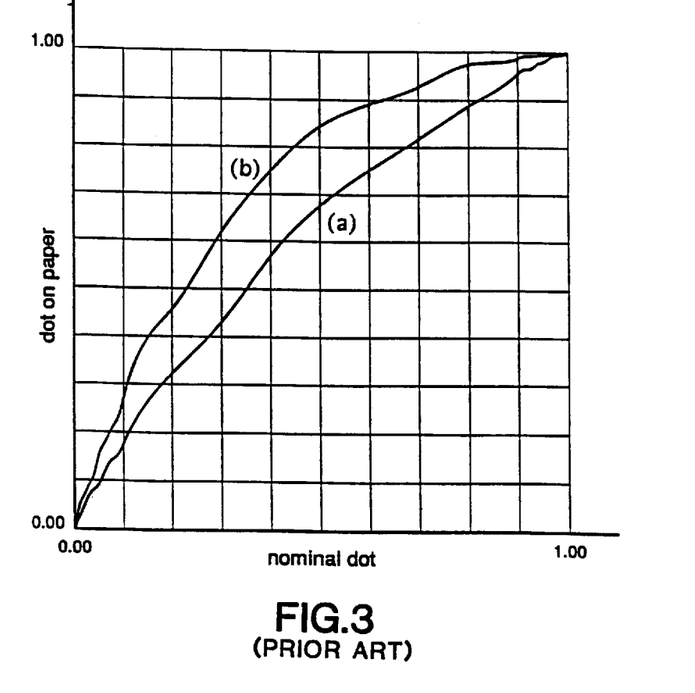
FIG. 3 compares tone gradation obtained with a conventional 150 lpi screen with that obtained by measuring a dispersed halftone using 21-micron dots.

FIG. 3 shows the result of the above discussions in practical situations. The x-axis shows the nominal dot value on a scale from 0.0 to 1.0. This is the digital value dot area as it is offered to the halftoning process. On the y-axis is shown the "dot area on paper" as it is obtained from the spatially-integrated density value using the Murray Davis equation. The Murray Davis equation is a mathematical ration of the assumption that a dot area can be associated with a tint that is proportional to the amount of its spatially integrated absorption (See Yule, J. A. "Principles of Color Reproduction", John Wiley and Sons, 1967).

In FIG. 3 the curve (a) shows the gradation that is obtained with a conventional screen having 150 lines per inch, while the curve (b) is the result of the measurement of a dispersed halftone with dots having a size of 21 microns. Both (a) and (b) show the global gradation of a negative plate making process (i.e., recorder gain, plate gain, physical and optical press gain). As is immediately clear from the figures, the total gain of the dispersed dot dither is significantly higher, throughout the entire tone scale, than the total gain of the clustered dot dither.

Figure 4:
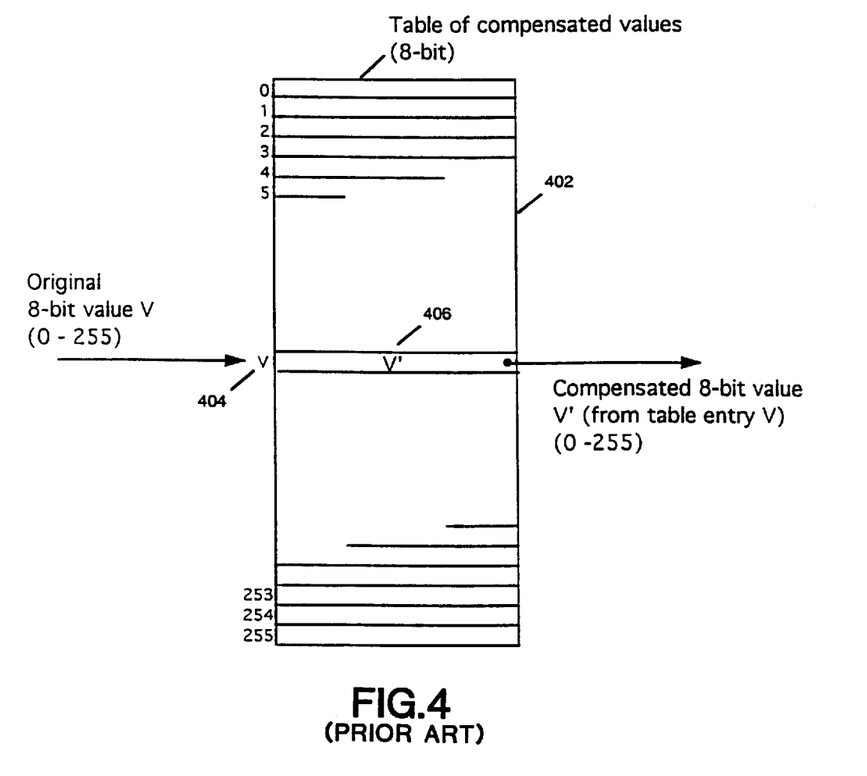
FIG. 4 illustrates the prior art table lookup method for tone-shift compensation.
Figure 5:
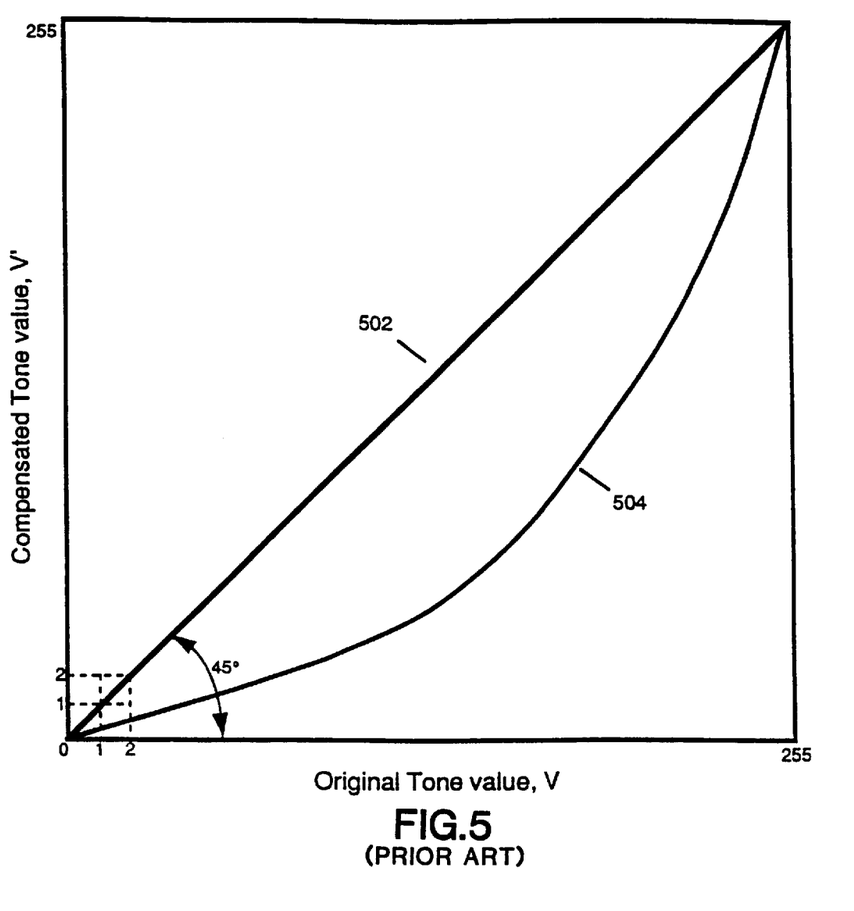
FIG. 5 illustrates the reduction in the number of reproducible tone values in the final image reproduction resulting from prior art table lookup tone-shift compensation.

In digital image processing systems, it is of course possible to compensate for the tone shifts which occur as a result of the dot gain. A common way to do this is by using a lookup table (LUT) that compensates for the tone shifts. This method is schematically represented in FIG. 4. The lookup table 402 transforms the original 8-bit value 404 into a new 8-bit value 406 which is compensated to cancel the tone shift which occurs in later steps of the reproduction process. A disadvantage of this approach however is that, as a result of the compensation accomplished by the lookup table, the number of reproducible shades of tone of the image is reduced. This is easily understood by means of FIG. 5, which shows the gradation compensated tone values V' as a function of given original tone values V. In the figure, the 45 degree line 502 corresponds to the case V'32 V, i.e., to no change in value. The curve 504 represents compensation for darkening in the lower tone values. It can be seen that, for the curve 504, certain of the original quantized shades are mapped to the same shade after correction, while certain of the available shades on the output axis scale are never used. In the example of the curve 504 of FIG. 5, input values V=1 and V=2 both map to the same output value V'=1 as a result of the 8-bit resolution limit.

Loss of tone resolution in the compensated values V' can be particularly severe if the lookup table of FIG. 4 must compensate for the steep gradation produced by a dispersed dot dither algorithm, in which case it is possible that the number of shades is reduced sufficiently to show visible tone quantization in the final image reproduction. It can be calculated that, if the gradation of curve (a) in FIG. 3 is compensated using an 8-bit table lookup procedure, the effective number of visible shades is reduced from the initial 256 to approximately 180.

Gradation Correction of a Periodic Screen Function

Figure 6:
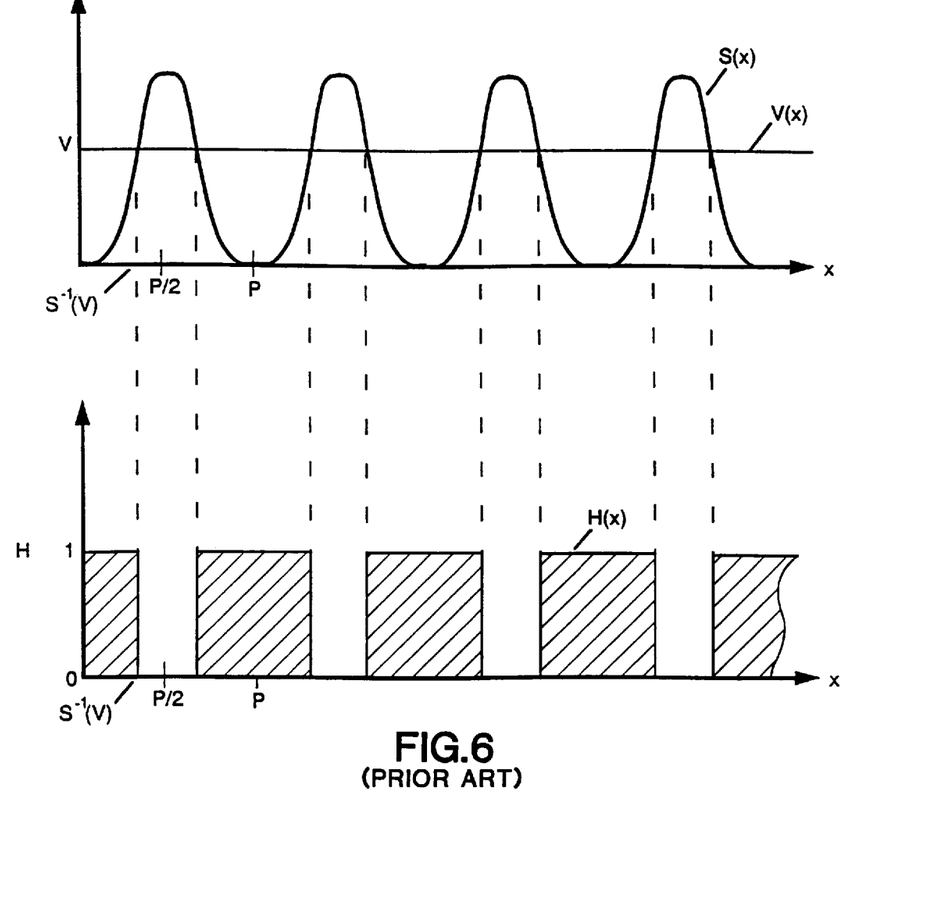
FIG. 6 illustrates the use of a periodic screen function with a constant contone value to produce a binary output value.

The use of a periodic screen function for gradation correction is known in the art. For example, a one dimensional model of a periodic screen function, typical of that used for dot-size modulation screening techniques, is shown in FIG. 6. In the figure, S is a screening or thresholding function which is periodic with regard to the position coordinate x, thereby yielding a set of values S(x) for given values of x. V(x) represents the pixel values as a function of the position coordinate x. Halftoning is achieved by comparing at every position x the pixel value V(x) with the screen function value S(x). If the latter is larger than the former, the halftone value H(x) is set to 0, otherwise it is set to 1:

$$\text{if } (V(x)<S(x)) \text{ then } H(x)=0; \text{ else } H(x)=1 \tag{1}$$

The integrated halftone dot value over the distance from 0 to X is equal to:

$$\int_{x=0}^{X} H(x)dx \tag{2}$$

The average halftone dot value A over the distance from 0 to X equals:

$$A = \frac{\int_{x=0}^{X} H(x)dx}{X} \tag{3}$$

Assuming now that:
1) V(x) is constant, with the value V;
2) S(x) is periodic and symmetrical with a period equal to P; and,
3) the distance from 0 to X is equal to a large number of periods P, the integral given by equation (3) is also equal to:

$$A = \frac{\int_{x=0}^{P/2} H(x)dx}{(P/2)} \tag{4}$$

or, taking into account equation 1:

$$A = \frac{\int_{x=0}^{S^{-1}(V)} dx}{(P/2)} \tag{5}$$

Calculating the integral yields:

$$A = S^{-1}(V)/(P/2) \tag{6}$$

The above results show that the average dot area A of a constant tint varies proportionally to the inverse screen function value of that tint, requiring of course that such an inverse screen function exists. If the screen function S consisted of a triangular wave function, the average dot area would vary proportionally with the tint value. If however, S(x) were equal to cos (2π/P), the average dot area would vary proportionally to the arccosine of the pixel value.

The fact that the relation between tone and average dot area can be controlled by means of a periodic screen function has made it possible, in prior-art processing using dot size halftone screening methods, to perform gradation compensation by manipulating the screen function rather than the pixel values themselves. If the periodic screen function is generated and altered at a high tone resolution (e.g., 16 bits) before it is converted to the same resolution as the image pixels (usually 8-bits), a reduction in the number of reproducible shades can be avoided, in contrast to the situation in which gradation compensation is carried out by altering the image pixels before halftoning.

As seen in the earlier discussion of dot gain, a non-periodic screen function, and in particular a stochastic screen function, produces such an increase in dot size that it is all the more necessary to be able to perform gradation compensation without loss of tone scale.

It is accordingly a general object of the invention to provide an improved method for correcting the gradation of a halftone image prepared using frequency-modulated halftone screening, without reducing the number of tone values which can be produced in the final image reproduction.

It is a specific object of the invention to provide gradation correction in combination with any non-periodic thresholding halftoning technology, including techniques which produce clustered dot patterns or dispersed dot dither patterns as the means for printing tone values.

It is a feature of the invention that it allows the use of different screening technologies, each requiring a different kind and quantity of gradation compensation, within a single application. This is for example the case when page components are combined of which some are halftoned using frequency modulation techniques, while others are halftoned with dot-size modulation techniques. This feature provides the advantage that images with detail and texture, for example, can be rendered using frequency modulation techniques, which provide superior detail rendering, while "flat" tints can be rendered using dot-size modulation techniques, which do not introduce graininess (which is particularly noticeable in flat tints).

It is an additional feature of the invention that, in addition to tone gradation corrections compensating for the gain effects described previously, gradation alterations may be made specifically for aesthetic purposes.

BRIEF DESCRIPTION OF THE INVENTION

The invention may be summarized as a halftone screen and method for generating halftones representing a continuous tone image, wherein the number of halftone dots per unit area varies non-proportionally with the tone values utilized as inputs to the screening process. As an aid to understanding the discussion to follow, the terms defined herein apply to the entire specification and claims, and are indicated by small capitalization. The term FREQUENCY-MODULATION HALFTONING shall mean any halftoning technique except bilevel, exclusively dot-size modulated, halftoning based upon a periodic screen function. Specifically included but without limitation are:

1. any halftoning technique in which the number of halftone dots per unit area varies with the tone value;
2. any halftoning technique in which the size or the microscopic density of the halftone dots, in addition to the number of dots per unit area, varies with the tone value; and,
3. any halftoning technique where the centers of the halftone dots are not laid out on a periodic grid.

The term FREQUENCY-MODULATION HALFTONE SCREEN shall mean a screen generated by the process of FREQUENCY-MODULATION HALFTONING. The term NON-HALFTONE VALUE(S) shall mean one or more of the following value(s):

1. screen function value(s);
2. contone pixel value(s);
3. error value(s);
4. threshold value(s); or,
5. error-altered pixel value(s).

Expressed in terms of the above definition, the invention can be described as a halftone screen, and a method for generating the halftone screen. The method comprises the steps of:

(A) generating NON-HALFTONE VALUE(S);
(B) altering at least some of the NON-HALFTONE VALUE(S) at a higher tone resolution than the tone resolution of pixel(s) comprising a source image; and,
(C) utilizing said at least some altered NON-HALFTONE VALUE(S) to produce halftone value(s) for the FREQUENCY-MODULATED HALFTONE SCREEN.

In one example of the method, the screen function values produced by the screening process, rather than image pixel values of the source image, are utilized to achieve the desirable gradation compensation. Alternatively, error diffusion techniques with integrated gradation compensation can be employed to achieve the desired compensation.

BRIEF DESCRIPTION OF THE DRAWINGS

The invention will be best understood from a detailed description of preferred embodiments thereof, selected for purposes of illustration, and presented with reference to the accompanying drawings, in which.

DETAILED DESCRIPTION OF THE INVENTION

One method for producing the halftone screen is now explained in formal terms for the gradation correction using a non-periodic screen function. In the halftoning art, the "non-periodic" characteristic of the screen function is typically referred to as "stochastic". Another method, implemented through error diffusion techniques, will also be explained. Finally, circuits are described which show embodiments of the invention according to the two methods.

Gradation Correction of "Stochastic" Screen Function

Figure 7A:
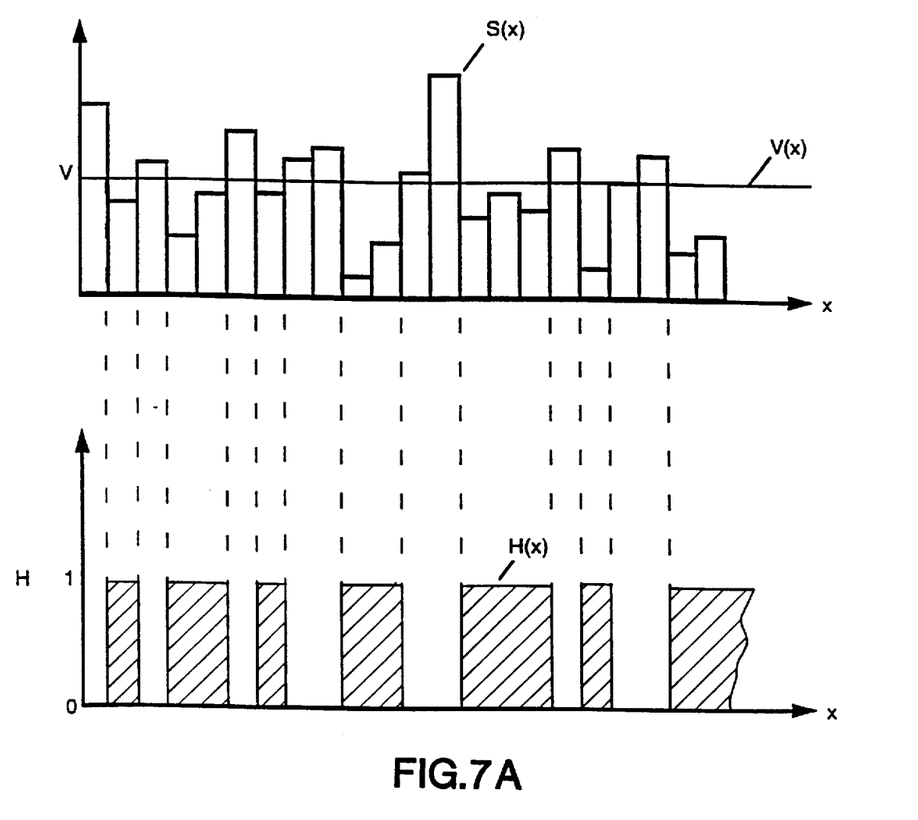
FIG. 7A and FIG. 7B illustrate the use of a stochastic screen function to produce binary output values, before and after application of the method of the invention.

Methods for producing a stochastic screen function are well known in the art, and are described in e.g., U.S. Pat. No. 5,111,310. In order to simplify the analysis, a one-dimensional model of a stochastic screening processed will be used. A stochastic screen function $S(x)$ produces a pseudo-random sequence of threshold values as shown in FIG. 7A. As in the case of the periodic screen function, the average integrated halftone dot value is expressed by:

$$A = \frac{\int_{x=0}^{X} H(x)dx}{X} \tag{7}$$

Figure 7B:
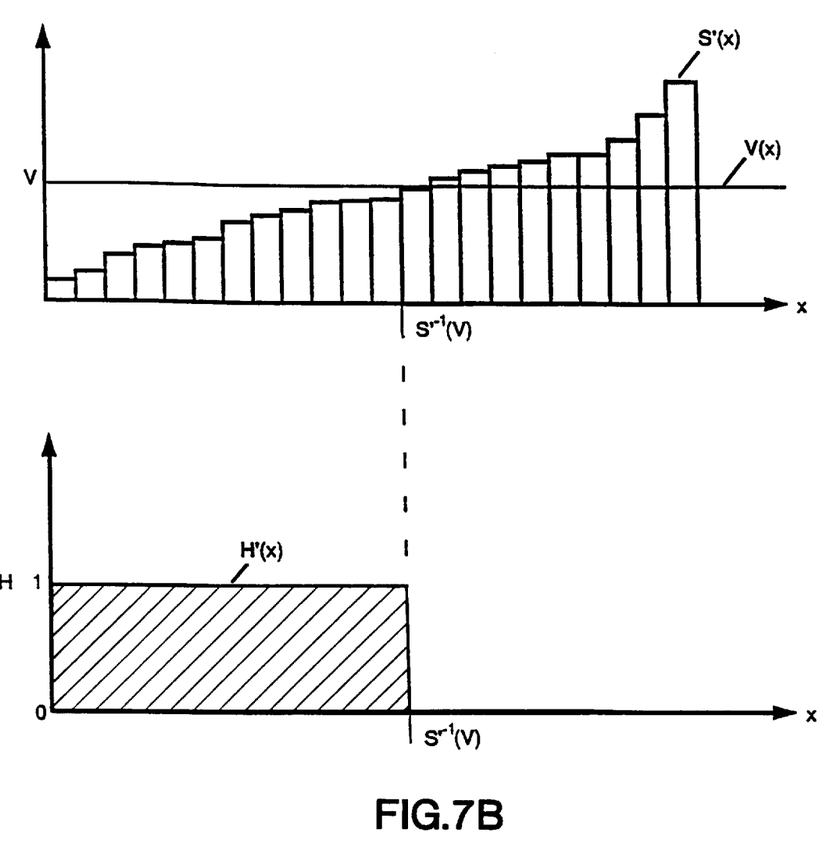

The expression (7) is difficult to evaluate. In order to simplify the evaluation, the screen function $S$ is replaced by another screen function $S'$ which produces exactly the same threshold values as the original statistical screen function S but in a different sequence. More precisely, the sequence of the threshold values of the function S' is such that the threshold values S'(x) are ordered according to their values, from smallest to largest. FIG. 7B shows a one-dimensional representation of the altered function S'(x).

For the latter screen function, the average integrated halftone dot value is given by:

$$A' = \frac{\int_{x=0}^{X} H'(x)dx}{X} \quad (8)$$

Both screen functions will produce exactly the same average integrated halftone dot values when averaged from 0 to X:

$$A'=A \quad (9)$$

This equality would still hold if both screen functions S and S' were to undergo the same transformation. Assuming that the pixel value is constant over the domain from 0 to X the equation (9) can be simplified to:

$$A' = \frac{\int_{x=0}^{S^{-1}(V)} H'(x)dx}{X} \quad (10)$$

By taking into account equation (1), the previous equation can be rewritten as:

$$A' = \frac{\int_{x=0}^{S^{-1}(V)} dx}{X} \quad (11)$$

And this leads, together with (9) to:

$$A = \frac{S^{-1}(V)}{X} \quad (12)$$

This leads again to the conclusion that the gradation of a halftone can be controlled by altering the screen function as opposed to altering the pixel values. If the stochastic screen function values are generated and altered at a high tone resolution before they are quantized to the same tone resolution as the image pixels of the source image, the gradation alteration does not result in a loss of the number of reproducible shades.

A similar result can also be obtained in combination with error diffusion methods. It is a well established fact that the precision by which error diffusion techniques are able to render tone values over large areas depends only on the precision at which the arithmetic is carried out. On the other hand, the "error feedback" in such methods explains why these algorithms by themselves produce dot distributions of which the number of halftone dots per unit area is always proportional to the tone value that is offered at their input. This means that a loss of reproducible shades in combination with error diffusion halftone screening can be avoided by first converting the original pixel values into a representation with a high tone resolution, applying the desired gradation alteration at this high tone resolution, and finally rendering the altered pixel values by means of an error diffusion technique that is carried out at (at least) the same high tone resolution.

Figure 8:
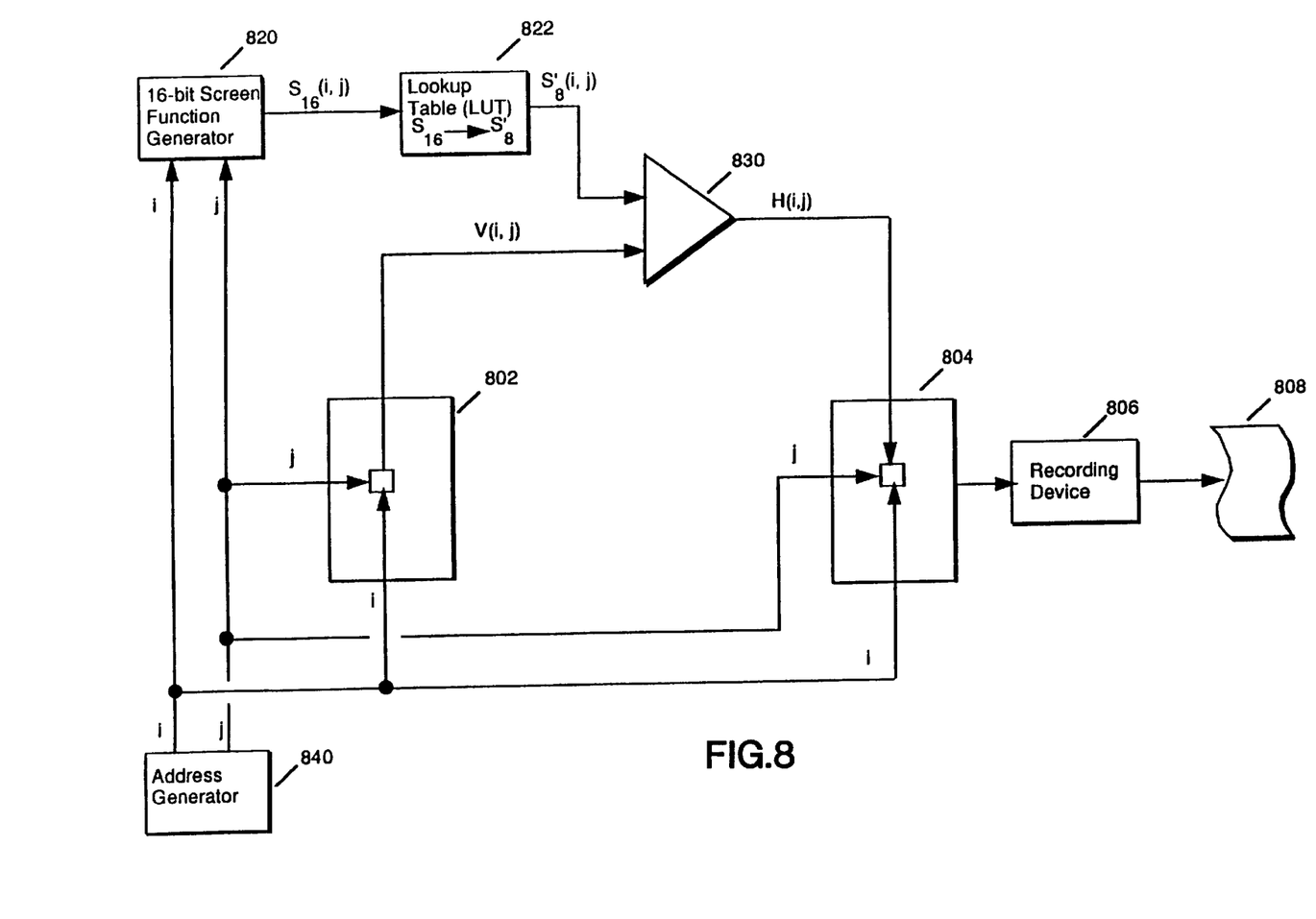
FIG. 8 shows a first circuit to perform gradation compensation using the method of the invention in combination with a binary recording device.

FIG. 8 shows a first circuit to perform the halftoning method for a non-periodic screen function in combination with a binary recording device. First the different building blocks of this circuit are described, followed by the operation of the circuit. Block 802 is a memory store containing the contone pixel values of an image. Typically these are 8-bit values, organized as N lines with M columns. The contents of block 802 can for example be the result of scanning a photographic original image. Block 804 is a memory store with the same layout as block 802, in which the halftoned pixel values are to be stored after processing. In the case of a binary recording device, every halftoned pixel has a word length of 1 bit. Block 806 is a binary recording device, capable of recording the information on a substrate 808. Block 820 is a unit that produces uncorrected, uncompensated 16-bit threshold values representing the stochastic screen function. Block 822 is a lookup table which converts uncompensated 16-bit screen function values $S_{16}$ to compensated 8-bit screen function values $S'_8$. Block 830 is a comparator and block 840 is an address generator.

The operation of the circuit is explained as follows. The address generator 840 sequentially generates the coordinate positions (i, j) corresponding to the indices i and j of all elements in block 802 and 804. At every coordinate position, a 16-bit screen function value $S_{16}(i, j)$ is produced by block 820, which is transformed into a corrected 8-bit threshold value $S_8(i, j)$ by the lookup table 822. This threshold value is compared with the pixel value V(i, j) in the comparator 830, and depending on the outcome of this comparison, a halftone dot value H(i, j), equal to 0 or to 1, is written at the coordinate position (i, j) of block 804. It will now be explained how the contents of lookup table 822 can be calculated.

In order to calculate the contents of the lookup table 822, one first determines the gradation alteration G(t) to be used. This is usually done by recording a "wedge-density strip" containing a number of steps in the tone scale through the uncalibrated process. Measuring the recorded density for each step of the wedge-density strip enables one to characterize and to model (for example by means of a polynomial) the behaviour of the uncalibrated device. The desired gradation compensation is then found as the function which alters the tone values such that the device produces the desired tone response. The gradation compensation function G(x) at that point is usually available in an "explicit" form, i.e., in the form of number pairs (x, G(x)). As a result of its conditional (and assumed previously verified) monotonic nature, the derivative of the function G does not change sign across its domain. By swapping the axis and coordinate values of the number pairs (x, G(x)), an explicit representation of the inverse gradation function $G^{-1}(x)$ is obtained, containing the couples (G(x), x). It is convenient at this stage first to:

1. rescale the data so that both axes (x, G(x)) are normalized (i.e., represented on a scale from 0.0 to 1.0); and,
2. move from an explicit to an implicit representation of the function $G^{-1}(x)$, for example by modeling $G^{-1}(x)$ as a polynomial (a convenient method for obtaining such a polynomial is the application of a regression technique to the couples (G(x), x) of the explicit notation).

The following fragment of pseudo code shows how the contents of the lookup table can be calculated:

Calculate_LUT ($G^{-1}$, LUT)
    unsigned char *LUT;
    float *$G^{-1}$;
    {

-continued

```
    int i, N16, N8;
    float x, y;
    N16 = 65535;
    N8 = 255;
    for (i = 0; i <= N16; i++)
    {
        x = (float) i/N16;
        y = G⁻¹(x);
        LUT[i] = (int) N8*y;
    }
}
```

It is evident that the lookup table 822 can contain data which alters the tone gradation of the input pixel values in any manner desired, subject only to the requirement that the functions G(x) be monotonic in nature. Accordingly, in addition to or instead of the above calculation, any monotonic function can be reduced to explicit form and stored in the table, including one aimed at altering the tone gradation for aesthetic purposes.

Figure 9:
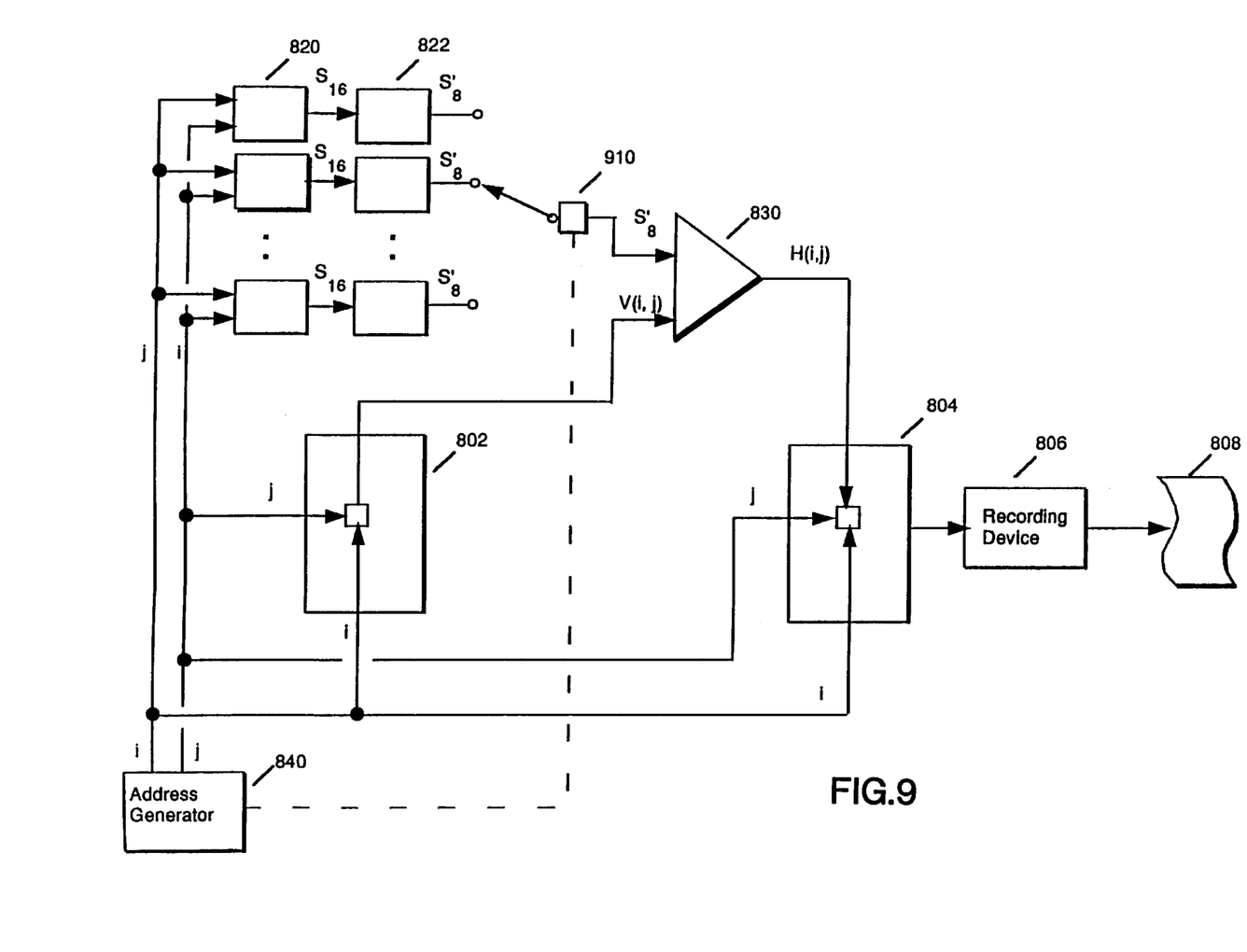
FIG. 9 shows a second circuit for gradation compensation, containing more than one screen function generator, and, FIG. 10 shows a third circuit for gradation compensation, based upon error diffusion screening techniques.

A second circuit for gradation compensation using a non-periodic screen function is shown in FIG. 9. The circuit is based upon that previously described except for the fact that it contains more than one screen function generator 820, each one having its own correction lookup table 822. It should be noted that the contents of the LUT's 822 are in general different from each other, and apply to different regions of the contone image in memory 802. Selector switch 910 is coupled to address generator 840, and selects which one of the compensated 8-bit values is selected for comparison with the contone value V(i, j) at the comparator 830. This mechanism effectively allows screening of different parts of the contone image in block 802 with different screen functions. One part of the image can for example be screened with a dot-size modulation technique, while another part can be screened with a FREQUENCY-MODULATION HALFTONING technique. Having the respective lookup tables calculated so that both processes produce the same gradation when rendered on the press makes possible the use of both technologies on the same page without annoying differences in gradation resulting from the simultaneous use of different screening processes.

It will be appreciated that being able to mix page elements using different screening technologies in combination with different gradation alterations is useful not only when at least one of them is a FREQUENCY-MODULATION HALF-TONING technique, but also when all of the components are rendered with any halftoning technique wherein individual elements require their own compensation (for example, due to different dot-size modulation line rulings, or for aesthetic purposes).

Figure 10:
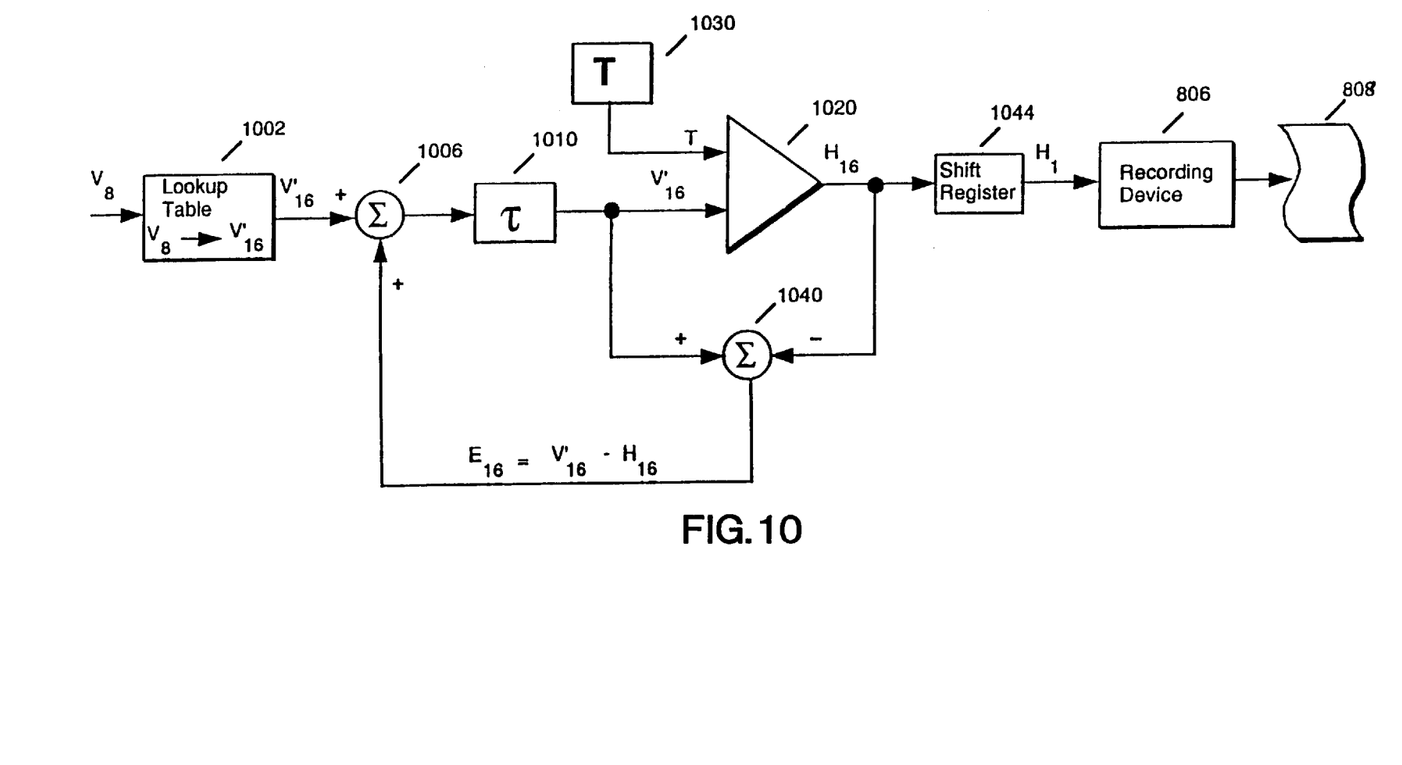

FIG. 10 shows an example of a circuit which can be used for implementation of error diffusion gradation compensation in combination with a binary recording device. The error diffusion algorithm in this drawing is one in which the halftoning error is entirely propagated to only one pixel. Block 1002 is a lookup table which transforms uncorrected 8-bit pixel values into corrected 16-bit values. The error of the previously halftoned pixel is added to the corrected halftone pixel with 16-bit precision in arithmetic unit 1006. At the next clock cycle, this 16-bit value is shifted through the delay register 1010. Comparator 1020 compares this value with the threshold value generated by block 1030. Depending on the outcome of this comparison, a halftone value of either 0 or 65536 is produced at the output of the comparator. The most significant bit of this number (which is either a 0 or a 1) is obtained as the output of shift register 1044, and used to turn the modulator of the laser recording device 806 either "on" or "off". At the same time, a new error is then calculated in arithmetic unit 1040 from the difference between the halftoned value at the output of the comparator 1020 and the value at its input.

Having described in detail preferred embodiments of our invention, it will now be apparent to those skilled in the art that numerous modifications can be made therein without departing from the scope of the invention as defined in the following claims.

What we claim is:

1. A method for producing a FREQUENCY-MODULATED HALFTONE SCREEN of a source image comprising at least one pixel, said method comprising the steps of:
  (A) generating at least one NON-HALFTONE VALUE;
  (B) altering said at least one NON-HALFTONE VALUE at a higher tone resolution than the tone resolution of said at least one pixel comprising said source image; and,
  (C) utilizing said at least one altered NON-HALFTONE VALUE to produce at least one halftone value for the FREQUENCY-MODULATED HALFTONE SCREEN.

2. A method for producing a frequency-modulated halftone screen of a source image comprising a plurality of pixels, said method comprising the steps of:
  (A) generating a plurality of NON-HALFTONE VALUES;
  (B) altering at least some of said plurality of NON-HALFTONE VALUES at a higher tone resolution than the tone resolution of pixels of said plurality of pixels comprised in said source image; and,
  (C) utilizing said at least some altered NON-HALFTONE VALUES to produce halftone values for the FREQUENCY-MODULATED HALFTONE SCREEN.

3. A method for rendering pixel values in a FREQUENCY-MODULATED HALFTONE SCREEN, said method comprising the steps of:
  (A) generating at least one non-periodic screen function S, having screen function values;
  (B) altering at least one value of said at least one non-periodic screen function S to produce a corresponding at least one non-periodic screen S';
  (C) utilizing said corresponding at least one non-periodic function S' and at least some of the pixel values to produce halftone values for the FREQUENCY-MODULATED HALFTONE SCREEN;
  (D) generating another non-periodic screen function S having screen function values;
  (E) altering at least one value of said another non-periodic screen function S to produce a corresponding another non-periodic screen function S'; and,
  (F) utilizing said corresponding another non-periodic screen function S' and pixel values other than said at least some of the pixel values to produce halftone values for the FREQUENCY-MODULATED HALF-TONE SCREEN.

4. A method for rendering pixel values in a FREQUENCY-MODULATED HALFTONE SCREEN, said method comprising the steps of:
  (A) generating a non-periodic screen function S having screen function values at a first tone resolution;
  (B) altering at least one value of said non-periodic screen function S to produce a non-periodic screen function S';

(C) changing said non-periodic screen function S' to a second tone resolution that is coarser than the first tone resolution; and, (D) utilizing said changed non-periodic function S' and said pixel values to produce halftone values for said FREQUENCY-MODULATED HALFTONE SCREEN.

5. A method for gradation control of the rendering of pixel values in a FREQUENCY-MODULATED HALFTONE SCREEN, said method comprising the steps of:

(A) determining a tone gradation function G desired to alter the gradation in the pixel values to be rendered;

(B) using said tone gradation function to obtain an inverse gradation function $G^{-1}$;

(C) generating a non-periodic function S having a first tone resolution;

(D) obtaining an altered screen function S' from said non-periodic screen function S and said inverse gradation function $G^{-1}$;

(E) quantizing said altered screen function S' to a second tone resolution which is coarser than said first resolution; and, (F) utilizing said quantized screen function S' and said pixel values to produce halftone values for said FREQUENCY-MODULATED HALFTONE SCREEN.

6. The method of claim 5 wherein said alteration compensates for press gain effects.

7. The method of claim 5 wherein said alteration compensates for recorder gain effects.

8. The method of claim 5 wherein said alteration compensates for the combined effects of press gain and recorder gain.

9. The method of 5 wherein said alteration adjusts the tonal characteristics for aesthetic purposes.

10. The method of claims 1, 2, 3, 4, 5, 6, 7, 8 or 9 wherein said halftone values are bilevel.

11. The method of claims 1, 2, 3, 4, 5, 6, 7, 8 or 9 wherein said halftone values are multi-level.

12. A photosensitive material comprising a halftone screen produced by the method of claims 1, 2, 3, 4, 5, 6, 7, 8 or 10.

13. The method of claims 1, 2, 3 or 4 wherein said alteration compensates for the effects of press gain.

14. The method of claims 1, 2, 3 or 4 wherein said alteration compensates for the effects of recorder gain.

15. The method of claims 1, 2, 3 or 4 wherein said alteration compensates for the combined effects of press gain and recorder gain.

16. The method of claims 1, 2, 3 or 4 wherein said alteration adjusts the tonal characteristics for aesthetic purposes.

* * * * *